United States Patent Office 3,048,642
Patented Aug. 7, 1962

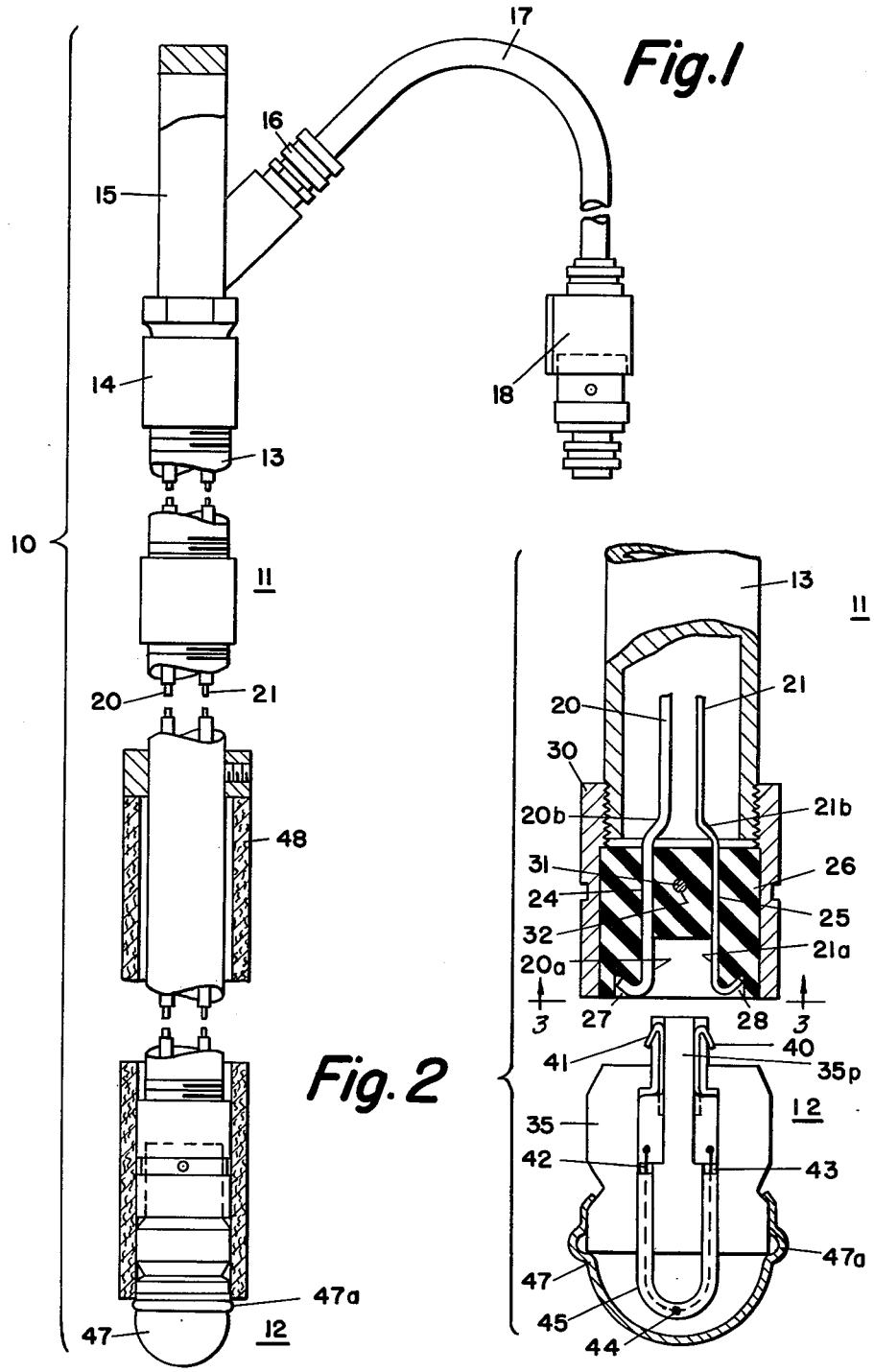

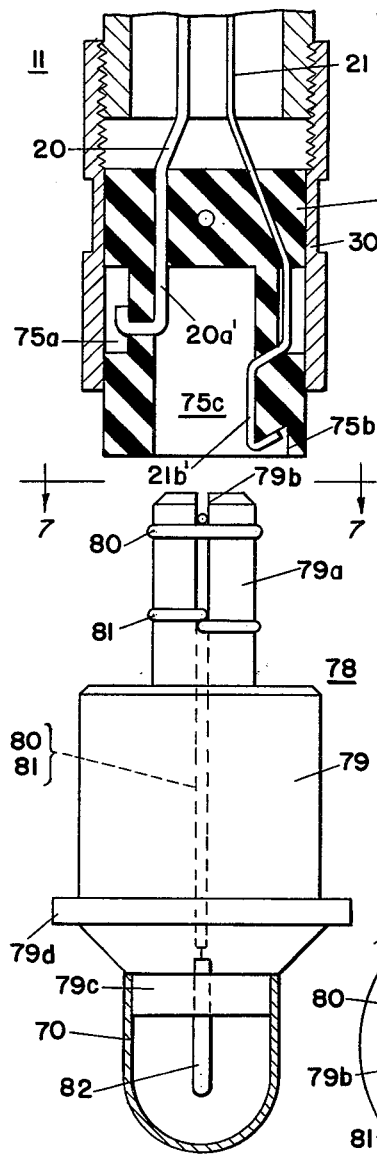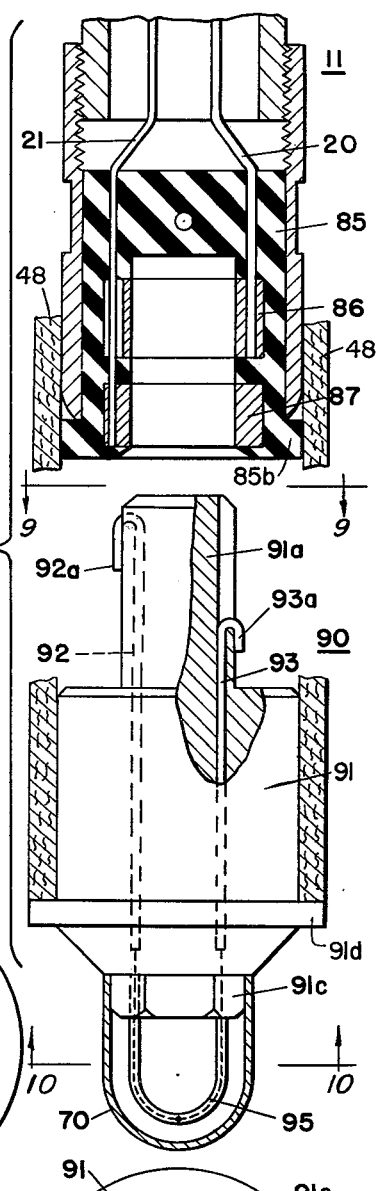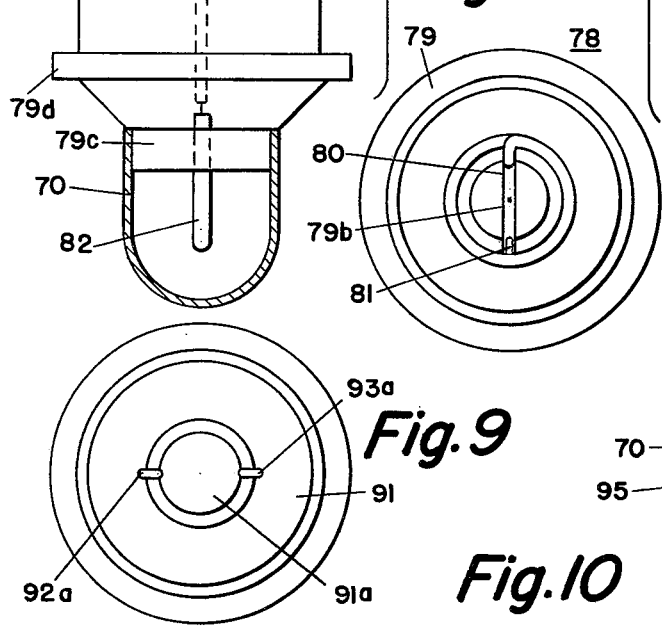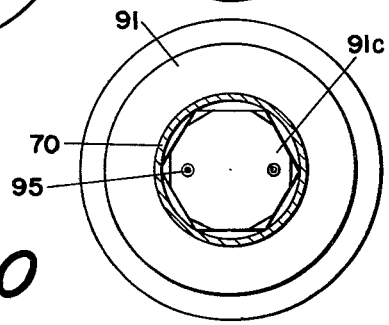

3,048,642
IMMERSION PYROMETER WITH EXPENDABLE PLUG-IN TEMPERATURE SENSING UNIT
Kenneth B. Parker, Jr., Norristown, Pa., assignor to Leeds and Northrup Company, Philadelphia, Pa., a corporation of Pennsylvania
Filed Sept. 1, 1959, Ser. No. 837,464
17 Claims. (Cl. 136—4)

This invention relates to immersion pyrometers of the type including a manipulator section and an expandable plug-in temperature-sensing section and has for an object the provision of improved electrical contact and mechanical connecting structure in which one of the sections includes resilient material for supporting the electrical contacts.

Immersion pyrometer systems utilizing expendable sensing units, such as expendable thermocouple units, where the units are to be used only once and then discarded are disclosed in the copending applications of Harold G. Mead, Serial No. 736,947, filed May 14, 1958, now United States Letters Patent No. 2,999,121; Donald Robertson and Raymond Ross, Serial No. 760,332, filed December 11, 1958; and Philemon J. Moore, Serial No. 820,732, filed June 16, 1959, now U.S. Patent No. 3,024,295. The use of expendable temperature-sensing units such as these has become increasingly important particularly in the manufacture of iron and steel where the temperature of the molten metal bath is detected by immersing the measuring or hot junction of a thermocouple device in the bath of molten metal and allowing it to remain until the thermocouple reaches the temperature of the bath. It is preferable to use an expendable thermocouple because of the fact that high temperatures and the nature of the molten metal bath produce change in calibration of a thermocouple due to contamination and consequently if used more than once and not frequently checked for accuracy, measurements may be accepted that are seriously inaccurate. Such inaccuracies are eliminated by using expendable, low-cost prefabricated units which may be easily and rapidly connected for use, a new one for each measurement, which after immersion in the bath of molten metal and the taking of the measurement are discarded.

Expendable units must be securely, mechanically and electrically connected to a holder or manipulator, and the problem of properly effecting such connection is a difficult one due to the adverse conditions met in molten metal pyrometry.

It is necessary when the sensing element is a thermocouple to provide the manipulator and expendable plug-in temperature sensing unit with polarized mating means which will withstand being heated to temperatures of the order of 1,000° F. and still provide positive electrical contact. It has been the practice to maintain the proper polarity between the manipulator section and the plug-in section by the use of a key or other similar locating structure such, for example, as mentioned in the aforesaid Robertson et al. application. This required that the plug-in temperature-sensing unit be disposed in a particular manner relative to the axis of the device in order for the two sections to be mechanically and electrically coupled. The manipulator is normally several feet long, for example, in the order of eight feet; and the lower half of the manipulator is adapted to be encased within a paper tube that protects the manipulator from the molten metal bath and provides heat insulation as well as making it easy to remove slag encrustation. To assemble the plug-in temperature-sensing unit on the lower end of the manipulator, the unit is first inserted in the lower end of the paper tube and the opposite end of the paper tube is then slid over the lower end of the manipulator. Since the locating key on the sensing unit or section is hidden from view of the operator, the operator must rely upon indicator marks and finally the "feel" between the plug-in temperature sensing section and the manipulator section to ascertain that the parts are in proper alignment for connection of the sections. This operation is difficult and hunting for the proper alignment is time-consuming. More important, however, since the supporting structure for the contacts in the prior "key" type embodiments is of non-resilient insulating material such, for example, as ceramic this has frequently resulted in breakage of the temperature sensing units or the contact structure in the immersion end of the manipulator section due to attempts to force the sections together when they were not properly orientated.

With expendable plug-in temperature sensing units, it is necessary that they be securely retained in the lower end of the manipulator section during immersion in the molten bath while the temperature measurement is being taken, and after removal from the bath, it is necessary that they can be readily disconnected preparatory to the insertion of a new unit for making a subsequent measurement. It has been the practice heretofore to rely upon the friction between the mating contact structures in the manipulating section and the plug-in section to mechanically hold the sections together. The materials of the electrical contacts are almost dead soft and the material of the body structures of the mating members is such that they have very little resilience. The sliding fit between the mating contacts cannot be too tight, otherwise the ceramic supports for the contacts will be damaged.

Accordingly, it is an object of the present invention to provide an immersion pyrometer device including a manipulator member and an expendable plug-in member each of which has a pair of spaced electrical contacts for cooperation with the other pair wherein one of the pairs of contacts is provided with resilient back-up structure to produce a coupling force that will insure good electrical and mechanical connection between the manipulator member and the sensing member.

More specifically, and further in accordance with the invention, the manipulator member of the immersion pyrometer device is provided with resilient material providing back-up structure for the electrical contacts, such resilient material comprising rubber or an equivalent. The back-up structure is so constructed that it not only supports the electrical contacts but is adapted to be deformed from its normal position and cooperate with structure of the plug-in temperature-sensing member to provide a good mechanical connection therewith.

For a more detailed understanding of the invention and for further objects and advantages thereof, reference is to be had to the following description taken in conjunction with the accompanying drawings in which:

FIG. 1 is an elevation partly in section and with certain parts broken away showing an embodiment of the invention;

FIG. 2 is an exploded fractional sectional view of the electrical connector at the lower end of the manipulator section and the expendable thermocouple unit shown in FIG. 1;

FIG. 6 is an exploded fractional view partly in section of a further modification of the invention;

FIG. 7 is an end view of the temperature-sensing unit taken along the lines 7—7 in FIG. 6;

FIG. 8 is an exploded fractional view partly in section of another modification of the invention;

FIG. 9 is a view taken along the lines 9—9 of FIG. 8; and

FIG. 10 is a view taken along the lines 10—10 in FIG. 8.

Figure 3:
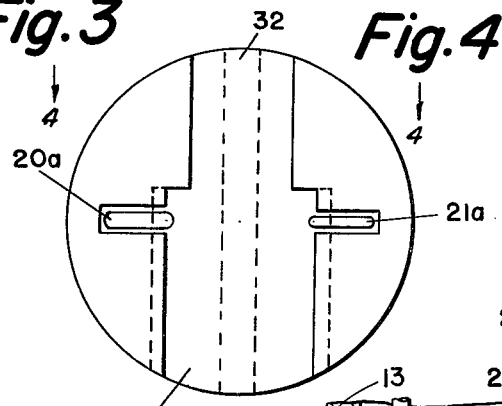
FIG. 3 is a plan view of the rubber connection block taken along the lines 3—3 in FIG. 2.

Referring to FIG. 1, the invention has been shown as applied to an immersion pyrometer device 10 which includes a manipulator section 11 and an expendable plug-in sensing element section 12. The manipulator section 11 may be of any desired length but is generally in the order of eight feet long and is made up of a plurality of steel pipe sections 13 which are threaded at their ends and are adapted to be joined together by coupling members 14. The outer end of the manipulator 11 which is adapted to be held by the operator is provided with a handle 15 having a bushing 16 extending from one side thereof through which the electrical cable 17 is adapted to pass. The outer end of the cable 17 is provided with an electrical connector 18 for connection of the pyrometer device to a temperature-measuring system. Such systems are well known in the art, and it is not believed necessary to illustrate them here. The outside of the electrical cable 17 is encased in suitable insulation such as rubber or plastic, extending between the bushing 16 and the connector 18. The extension wires 20 and 21 which are inside the cable 17 are insulated from each other through the length of the manipulator section 11 by means of individual insulating sleeves such for example as woven glass tubing.

At the lower or immersion end of the manipulator section 11, FIG. 2, two bare portions of the lead wires 20 and 21 are threaded through passages 24 and 25 in an electrical insulator member or contact block 26 of improved construction. The insulator 26 is made from a resilient material, such as neoprene rubber having a durometer of 80–90 or equivalent resilient material, and is provided with recesses or grooves 27 and 28 for receiving bent ends of the respective lead wires 20 and 21. The grooves 27 and 28 are molded in the rubber body of contact block 26 and the latter provides resilient back-up structure for the contact portions 20a and 21a. At the opposite end of the insulator 26 portions of the extension wires 20 and 21 are bent at 20b and 21b to cooperate with the bent terminal portions 20a and 21a for holding the extension wires in position against the contact block 26 in avoidance of the longitudinal displacement of the extension wires when the plug-in section 12 is inserted into the contact block 26. This electrical contact structure per se is described and claimed in the aforesaid application Serial No. 760,332. The rubber contact block 26 is shown in more detail in FIGS. 3 and 4, and it may be noted that in addition to having molded therein the longitudinal passages 24 and 25 and recesses 27 and 28, it likewise has molded therein a transverse passage 32. The contact block 26 is adapted to be secured to the lower end of the manipulator section 11 by means of a contact block mounting coupling 30, FIG. 1, and a pin 31 which extends through the transverse passage 32 in the block 26 and through aligned openings in the walls of the mounting coupling 30. The upper end of the mounting coupling 30 as shown in FIG. 2 is provided with female threads for engaging the male threads at the lower end of the pipe section 13.

The expendable thermocouple section 12 includes an insulator member illustrated as a ceramic body 35 preferably formed in two sections, only one of them showing in FIG. 2. The body 35 supports contact structures 40 and 41 made of compensating extension lead wire material, the lower ends of which, as seen in FIG. 2, are connected to the respective ends of thermocouple elements 42 and 43. The thermocouple elements are joined together to form the heat-responsive or measuring junction 44. The elements 42 and 43 throughout the major length thereof including the measuring junction 44 are enclosed within a thin-wall sheath 45 formed of heat-refractory silica or quartz; the thermocouple construction including the protective tubing is more fully described and claimed in the aforesaid application Serial No. 736,947, now Patent No. 2,999,121. The two ends of the tube 45 extend into passages of the ceramic body 35, FIG. 2.

The conductors or lead wire structures 20 and 21 are selected to be of a suitable compensating extension lead wire material for use with the materials employed in the thermocouple so that the effective cold junctions for the measuring system will be at the measuring instrument. The contacts 40 and 41 likewise are made of the same compensating extension lead wire material in order to preserve continuity of the thermocouple circuit. Those skilled in the art will understand that if the element 42 be of platinum and the element 43 be of an alloy of platinum plus 10 percent rhodium, the extension wire 20 will comprise an alloy of essentially nickel and copper, approximately 98 percent copper, 1 percent nickel, .5–.75 percent manganese, and miscellaneous impurities; and the extension wire 21 will be made of copper. The contacts 40 and 41 are made of the same alloy as that used in the compensating extension lead wires 20 and 21. When thermocouples of other materials are utilized, the materials used for the extension lead wires and the contacts will be correspondingly changed to provide the desired results.

Figure 4:
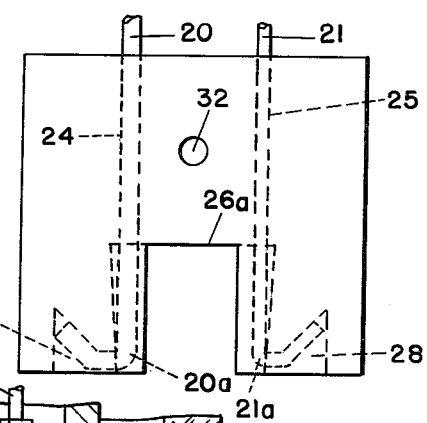
FIG. 4 is an inverted rear elevation of the rubber contact block taken along the lines 4—4 of FIG. 3.

As may be seen in FIG. 2, the ceramic body 35 is provided with a projection or key structure 35p which partially supports the contacts 40 and 41. The projection 35p includes a narrow portion which provides back-up structure for the contacts 40 and 41, and it also includes a wider portion to the rear of the contacts as shown in FIG. 2. The contact block 26, as shown in FIGS. 3 and 4, is provided with a recess 26a which is complementary in shape to the projection 35p. The wider portion of the recess 26a carries the contacts 20a and 21a, and it will be noted that such wider portion is of longer vertical dimension in FIG. 3 than the narrow portion of recess 26a. The portion of the narrow portion of projection 35p which backs up the contacts 40 and 41 plus the length of the wider portion of projection 35p is of a length corresponding to that of the wider portion of recess 26a in contact block 26. Thus, when the projection 35p is inserted in the mating contact block 26, the contacts 41 and 40 will respectively engage contact portions 20a and 21a with the edges of the contacts 41 and 40 sliding against the shoulders formed where the narrow portion of recess 26a enters the wider portion.

As will be noted in FIGS. 3 and 4, the sides of the wide portion of recess 26a have a back draft so that the bottom of the recess at the wide portion is of greater width than the top of said portion. This is most clearly shown in FIG. 4. The dimension between the contact portions 20a and 21a is such that there is an interference fit with the mating contacts 41 and 40. However, by reason of the fact that the contact block 26 is made from a resilient rubber-like material, the contacts 20a and 21a will move apart to receive mating contacts 41 and 40 during insertion of the projection 35p. They will also tend to move back toward their normal positions as the projection 35p is bottomed in the recess 26a and there will result a good electrical and mechanical connection between these mating contacts. The rubber contact block 26 provides resilient back-up for the contacts 20a and 21a, thus giving them an effective springiness which they ordinarily do not themselves possess by reason of the fact that they are made from substantially dead soft metals. The mating contacts 41 and 40 likewise are made from the dead soft metals and thus the resiliency for the coupling is provided by the rubber contact block 26. The resiliency of the rubber block 26 not only insures a good wiping action when the contacts are slid relative to each other, but it likewise provides a mechanical force having a component transverse to the longitudinal axis of the manipulator section 11 for holding the contacts together. Although the rubber contact block 26 may be subjected to high temperatures, in the order of 1,000° F. as are encountered in molten metal bath pyrometry, nevertheless it has been discovered that the contact block 26 maintains its resiliency even after a great number of immersions. By reason of the resilience of the contact block 26, there is avoided any damage or breakage to the ceramic block 35 in the sensing section 12, FIG. 2.

To protect the thermocouple assembly from mechanical injury prior to making a temperature measurement therewith, there is provided a metal cap 47 which is adapted to be attached to the immersion end of the body 35, FIGS. 1 and 2. The metal cap 47 is rigidly secured to the body 35 and forms an integral part of the temperature-sensing unit 12. The cap 47 not only prevents mechanical injury to the thermocouple during shipping and handling, but also protects the assembly from slag floating on top of the molten bath. This is described more fully in said aforementioned copending applications. The cap 47 is provided with a bead 47a which extends around the circumference of the cap and forms a shoulder which is engaged by the lower end of a cardboard or paper protection tube 48 disposed on the lower end of manipulator section 11, FIG. 1. The paper sleeve 48 provides heat insulation for the plug-in contacts, retards deterioration of the pipe 13 and makes easier the removal of slag encrustation. The sleeve 48 may be of paper about one-quarter inch thick and is expendable along with the plug-in temperature unit 12.

Figure 5:
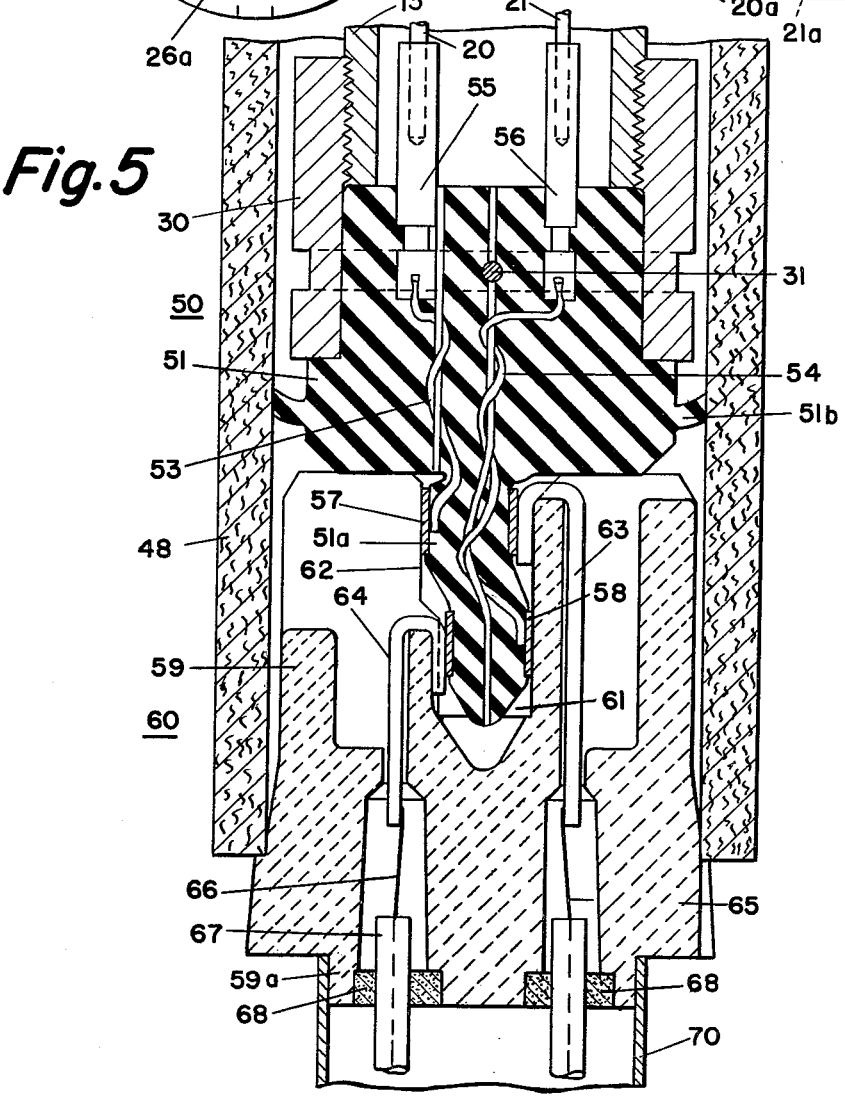
FIG. 5 is a fractional sectional view of a modification of the invention showing the contact structures of the manipulator section and expendable sensing plug-in section in engagement.

Referring now to FIG. 5, there is shown a modification of the invention in which the resilient contact block on the manipulator section is provided with a projection for supporting the contact structure. This is an arrangement of the non-directional type as distinguished from the the directional type employing key structure as previously described in connection with FIGS. 2 and 4. Contact structures of the non-directional type per se are generically claimed in the aforesaid application Serial No. 820,732. The manipulator section 50 shown in FIG. 5 includes a molded rubber contact block 51 which is adapted to be retained within the coupling 30 by the pin 31. The contact block 51 is provided with a projection 51a also made of rubber or equivalent resilient material. When the contact block 51 is molded, the projection 51a normally extends in a straight undistorted position rather than in the distorted position shown in FIG. 5. The flexible lead wires 53 and 54 are wrapped around rigid wires used in the molding operation and normally occupying the passages shown in FIG. 5. The flexible lead wires shown as 53 and 54 are connected to contact members 55 and 56 which in turn are adapted for connection to the extension wires 20 and 21 respectively of FIG. 1. The lower ends of the flexible wires 53 and 54 are welded or otherwise secured to contact rings 57 and 58, which are respectively carried by the projection 51a. After the contact block 51 is molded, the supporting wires are withdrawn from the block 51 and the flexible wires 53 and 54 and the contacts 55—58 are maintained in place as shown in FIG. 5. The contacts 57 and 58 are made of a material corresponding to the material of the extension lead wires 20 and 21.

The contact block 51 is molded so that the projection 51a will extend along the central axis thereof. The purpose of this will now be described. The body member 59 of the plug-in sensing unit 60 is made from a suitable material such as ceramic and has a centrally disposed cylindrical recess 61 therein which is coaxial with the axis of the contact block 51. The upper end of the recess 61 is provided with a counterbore 62 which is off-center with respect to the axis of the body member 59. Contact wires 63 and 64 extend into the interior of the body member 59 and at their lower ends they are connected respectively with the thermocouple wires 65 and 66, which extend through a U-shaped silica tube 67 to form a thermocouple assembly similar to that described in connection with FIG. 2. The legs of the U-shaped tube 67 are adapted to be secured to the lower end of the body member 59 by suitable cement 68. The contacts 64 and 63 are preferably made of round compensating lead wire material similar to lead wires 20 and 21 respectively. The upper end of member 63 is bent over so that it extends into and along the side wall of the counterbore 62. The body member 59 is slotted and the contact member 64 is bent over in the slot so that it extends into and along the side wall of the recess 61 near its lower end. As may be seen in FIG. 5, the bent-end portion of contact 63 is adapted to engage the ring contact 57 on projection 51a, and the bent-end portion of contact 64 engages the ring contact 58 on the lower end of projection 51a. The contact 63, upon engagement with the contact 57, causes the rubber projection 51a to be distorted and bent to the left out of its normal coaxial position with respect to contact block 51. This distortion tends to move the lower end of projection 51a, which carries contact 58, also to the left. However, contact 54 engages the contact ring 58 forcing the latter to the right for distorting the projection as shown in FIG. 5. The restoring force produced by the distortion of the rubber projection 51a provides pressure for effecting a good electrical contact between the mating contacts 63 and 57 and 58 and 64. It is also to be noted that the peculiar twist imparted to projection 51a causes the outer end to hook under the bent-over portion of contact 63 in a manner to provide retention of body 59 in mechanical contact with block 51.

The body member 59 of the plug-in sensing unit 65 is maintained in axial alignment with the manipulator section by reason of the paper tube 48 which slides over the contact block 51. The contact member 51 is also provided with a flexible deformable flange 51b which is molded integrally therewith and has a diameter somewhat greater than the internal diameter of the paper tube 48. When the paper tube 48 is slid over the end of the maniplator, the flange 51b will be distorted or deformed in an upward direction as shown in FIG. 5. This will tend to releasably retain or hold the paper tube on the manipulator when the device is held in a vertical position and prevent the tube from sliding off from the manipulator. To remove the paper tube 48 from the device, the paper tube is pulled in a downward direction as viewed in FIG. 5 forcing the rubber flange 51b to flex in the opposite direction. After the flange has been forcibly flipped it permits easy removal of the paper tube 48. From the foregoing description, it will be seen that the resilient projection 51a of contact block 51 not only provides a resilient back-up structure enabling a good electrical contact to be made between the mating pairs of contacts, but it also, by reason of its deformability or distortion, provides a good mechanical connection between the plug-in sensing unit 60 and the manipulator section 50 and between section 50 and tube 48 so as to retain tube 48 in place and the plug-in sensing unit in the end of the manipulator during a temperature measurement.

The lower end of the plug-in sensing unit 60 is provided with a metal cap 70 which is adapted to protect the thermocouple assembly both prior to and during insertion of the device into the molten bath. The lower end of the body member 59 is provided with projecting structure 59a of hexagonal shape similar to that shown in FIG. 10, later to be described. The metal cap 70 is forced over the chamfered corners of the projecting structure 59a and is retained in place due to the tight fit between the inner wall of the cap 70 and the corners.

The modification shown in FIG. 5, with the contacts of the manipulator carried by rubber projection 51a, enables the operator to see that the contacts are clean before the expendable thermocouple unit 60 is attached thereto. This is an advantage over the modification in which the contacts on the manipulator section are retained in recess structure of the contact block as it eliminates the possibility that dirt or other foreign matter will clog the contacts without being noticed by the operator and thus lead to an erroneous temperature measurement.

Referring to FIGS. 6 and 7, there is shown a further modification of the invention. In FIG. 6 it will be noted that the contact arrangement is non-directional. The lower end of the manipulator section 11 is provided with a resilient contact block 75 which is made of rubber or equivalent resilient material the same as the contact block 26 in FIG. 1. The extension lead wires 20 and 21 extend through the upper portion of the contact block 75 and are bent at their lower ends into recesses 75a and 75b at the lower end of the contact block 75. With this arrangement, the exposed portions of 20a' and 21b' are disposed one above the other in the contact block 75 to provide spaced contact structure. The contact block 75 is retained in the coupling 30 in similar manner to that of contact block 26 in FIG. 1.

The plug-in sensing unit 78, FIGS. 6 and 7, includes a body portion 79 which may be made from wood or ceramic or equivalent heat-insulating material. The body portion 79 in its upper end includes a projection 79a of diameter corresponding to the inside diameter of the circular recess or counter-bore 75c in contact block 75. The body member 79 as shown in FIG. 7 is provided with two passages which extend axially therethrough and are spaced from each other at opposite ends of an internal diameter of the projection 79a. These passages are adapted to receive sections of extension lead wire material 80 and 81. The lead wire 80 extends to the upper portion of projection 79a, as shown in FIG. 6, is passed through a cross-slot 79b and wrapped therearound with the end of the wire 80 projecting back into the cross-slot 79b, to form a ring contact structure. The wire 81 is wrapped around the projection 79a in similar manner to the wire 80, but at a lower position. The end of the wire 81 extends back into the cross-slot 79b of projection 79a and provides a second ring contact structure on the projection 79a formed from wire 81. It will be noted that the contact wires 80 and 81 are so spaced on projection 79a that they will mate with the contacts 20a' and 21b' in the contact block 75 of the manipulator section. Since the ring contacts formed by wires 81 and 80 extend completely around the projection 79a, the plug-in sensing unit 78 will make good electrical contact with the manipulator section regardless of the angle at which projection 79a is inserted into recess 75c. The lower ends of the wires 80 and 81 are connected to the respective wires of a thermocouple assembly 82 in manner similar to that previously described in connection with the above modification.

The thermocouple assembly 82 is adapted to be protected with a metal cap 70 which is retained in place on a projection 79c of body member 79. The projection 79c is preferably hexagonal as later to be described in connection with FIG. 10. Body member 79 is provided with a shoulder or flange 79d which protrudes from the body member 79 and provides a support for the cardboard tube which ordinarily covers the connection between the manipulator section and the plug-in sensing unit section, but which is not shown in FIG. 6.

Referring to FIGS. 8–10, there is shown a further modification of the invention. In FIG. 8 it will be seen that the lower end of the manipulator section 11 is provided with a resilient or rubber-like contact block 85 through which extension lead wires 20 and 21 extend, the lower ends of which are connected to contact rings 86 and 87 respectively. The plug-in sensing unit 90 includes a body portion 91, similar in shape to that of body member 79 of FIGS. 6 and 7. The body portion 91 is made from a material which itself has some resiliency such for example as a soft wood such as white pine. The contact wires 92 and 93, which extend therethrough, are not wrapped around the projection 91a but instead are bent over at their upper ends to provide contacts 92a and 93a which are adapted to mate with the corresponding contact rings 86 and 87 in the manipulator section. In this modification it will be noted that the cross-slot is shallow for contact 92a and made deeper for contact 93a. The lower ends of the contact wires 92 and 93 are connected to the respective ends of the thermocouple wires of a thermocouple assembly 95, similar to that shown in FIG. 2.

As will be seen in FIG. 8, the body member 91 is provided with a shoulder or flange 91d which protrudes from the body member 91 and provides a support for the cardboard tube 48 which ordinarily, as in FIG. 1, covers the connection between the manipulator section 11 and the plug-in sensing section 90 in manner similar to that described above in connection with the corresponding flange 79d on body member 79 in the modification of FIGS. 6 and 7. The resilient or rubber-like contact plug 85 in FIG. 8 is provided with a resilient flange 85b which is molded integral therewith and protrudes therefrom frictionally to engage the internal surface of the paper tube 48.

The lower end of the body member 91, as shown in FIGS. 8 and 10, is provided with a non-circular projection 91c. The projection 91c is in the shape of a polygon and has been illustrated as a hexagon. The protective cap 70 for the thermocouple assembly 95 is circular in cross-section and has an inside diameter slightly smaller than the dimension across the opposite corners of the hexagon so that there will be a tight press fit between the corners of the hexagonal projection 91a and the interior surface of the cap 70. The walls of the cap are relatively thin so that they will distort and apply a substantial holding force across the corners of the hexagon. This enables the cap to be readily secured over the thermocouple assembly and to the body member 91 solely by the pressed fit and without need for bending or crimping as is the case with cap 47 shown in FIG. 2. This arrangement makes it possible to remove the cap 70 from the body member 91 for inspection of the thermocouple assembly 95 without damage to either the cap 70 or the body member 91.

The cap 70 is made from a material which will melt or otherwise disintegrate when immersed in the molten bath. The cap 70 may be made from any suitable material which is distortable and has the characteristics of being resilient and sufficiently stiff to retain its shape. Caps made of cold rolled steel .010 inch thick have been found satisfactory. Other examples of suitable materials are sheet aluminum and molded plastics of various types including hard rubber.

From the foregoing it will be seen that in all of the embodiments illustrated, the contacts of at least one of the manipulator and plug-in temperature-sensing sections of the immersion pyrometer are backed up by resilient material such as rubber. This construction not only provides for a good electrical contact between the two sections of the pyrometer but also provides a strong mechanical coupling between the two sections and eliminates the possibility of breakage of the contact block on the manipulator section.

It is to be understood that this invention is not limited to the specific arrangements shown and that changes and modifications may be made within the scope of the appended claims.

What is claimed is:

1. An immersion pyrometer device for measuring the temperature of a bath of molten material comprising (a) a manipulator section having a pair of leadwires extending therethrough to the lower end thereof, (b) a first pair of spaced electrical contacts of substantially dead soft metal connected to said leadwires and supported by first body structure carried by said lower end of said manipulator section, (c) an expendable plug-in temperature-sensing section including second body structure of electrical and heat-insulating material which will withstand immersion in the bath of molten material the temperature of which is to be measured, (d) a thin-walled sheath of electrically insulating and heat-transmitting refractory material supported at one end of said second body structure and cooperating therewith to form an enclosure for heat-responsive means, (e) heat-responsive means located within said enclosure, (f) a second pair of spaced electrical contacts of substantially dead soft metal supported by said second body structure at the other end thereof and connected to said heat-responsive means and engaging said first pair of contacts, and (g) one of said body structures in the region of its pair of electrical contacts of substantially dead soft metal being comprised of resilient material providing resilient back-up structure for its pair of contacts to produce a coupling force maintaining positive engagement between said pairs of contacts.

2. An immersion pyrometer device according to claim 1 wherein said body structure on said manipulator section includes the resilient material providing said back-up structure for said first pair of contacts.

3. An immersion pyrometer device according to claim 2 wherein said resilient material comprises a rubber composition.

4. An immersion pyrometer device according to claim 2 wherein said resilient material on said body structure of said manipulator section includes a projecting portion for supporting said first pair of spaced contacts thereon.

5. An immersion pyrometer according to claim 2 wherein said resilient material on said body structure of said manipulator section includes a recess portion supporting said first pair of spaced electrical contacts.

6. An immersion pyrometer device according to claim 1 wherein said pair of spaced electrical contacts backed up by said resilient material comprise ring structure.

7. An immersion pyrometer device according to claim 1 wherein one pair of spaced electrical contacts comprises wire structure and the cooperating pair of electrical contacts comprises wire structure wound in the form of rings.

8. An immersion pyrometer device comprising a manipulator member and a plug-in temperature sensing member, mating contact structure on each of said members and adapted for engagement therewith, a paper sleeve disposed on said manipulator member and overlapping said plug-in sensing member to shield said contact structure, and deformable means carried by said manipulator member for releasably retaining said sleeve on said manipulator member.

9. An immersion pyrometer device comprising a temperature-sensing means, a body adapted to support said temperature-sensing means, said body having projecting structure in the shape of a polygon adjacent said temperature-sensing means, and a distortable protective cap of a resilient material enclosing said temperature-sensing means, said cap having wall structure spaced tightly to engage the corners of said projecting structure and retained on said body by the force produced upon distortion of said cap to produce engagement with the corners of said polygon.

10. An immersion pyrometer device comprising a temperature-sensing means, a body, said temperature-sensing means being supported by said body and projecting therefrom, a protective cap of circular cross-section enclosing said temperature-sensing means, said body having structure engageable with said cap, said structure being of non-circular cross-section and having one dimension slightly larger than the internal diameter of said circular cross-section of said cap, and said cap being of a distortable resilient material and retained on said non-circular structure of said body by the force produced upon distortion of said cap necessary in effecting engagement of the cap with the portion of the body having said dimension larger than said internal diameter of said cap.

11. An immersion pyrometer device according to claim 10 wherein said cap-receiving structure of said body is shaped in the form of a hexagon and the dimension across the opposite corners of said hexagon is slightly greater than the internal diameter of said cap.

12. The sub-combination of an expendable plug-in thermocouple unit comprising body structure having heat-insulating material supporting a refractory protected thermocouple at an immersion end thereof, the opposite end of said body structure terminating in a portion having a longitudinally disposed cylindrical wall of resilient material, a pair of leadwires of substantially dead soft metal connected to said thermocouple adjacent the immersion end of said body structure and extending through said body structure toward said opposite end, and end portions of said leadwires maintained against said cylindrical wall portion to provide electrical contacts displaced along the longitudinal axis of said body structure with said electrical contacts being resiliently backed up by said cylindrical wall of resilient material.

13. An expendable plug-in thermocouple unit according to claim 12 wherein said cylindrical wall comprises soft wood-like resilient material.

14. An expendable plug-in thermocouple unit according to claim 12 wherein said cylindrical wall is formed from relatively soft wood and includes slots for receiving bent end portions of said leadwires which provide said electrical contacts.

15. A manipulator for an expendable plug-in thermocouple unit comprising tubular structure having an end for receiving an expendable plug-in thermocouple unit, a contact block of resilient material supported at said end of said tubular structure, leadwires of substantially dead soft metal extending through said tubular structure to said contact block, and contact structures of substantially dead soft metal carried by said contact block and electrically connected to said leadwires, at least portions of said contact structures being resiliently backed up by said resilient material of said contact block to produce a coupling force that will insure good electrical and mechanical connection between said manipulator and the expendable plug-in thermocouple unit.

16. A manipulator according to claim 15 wherein said manipulator contact structures consist of portions of said leadwires.

17. The subcombination of an expendable plug-in thermocouple unit comprising body structure having heat-insulating material supporting a refractory protected thermocouple at an immersion end thereof, the opposite end of said body structure terminating in a portion having longitudingly disposed wall structure of resilient material, a pair of electrical leads connected to said thermocouple adjacent the immersion end of said body structure and extending through said body structure towards said opposite end, and bare end portions of said leads maintained against said wall structure of resilient material at spaced locations to provide electrical contacts, said electrical contacts being resiliently backed up by said wall structure of resilient material providing resiliency for said contacts.

References Cited in the file of this patent

UNITED STATES PATENTS

| | | |
|---|---|---|
| 2,097,370 | Hayashi | Oct. 26, 1937 |
| 2,103,548 | Obermaier | Dec. 28, 1937 |
| 2,131,065 | Obermaier | Sept. 27, 1938 |
| 2,463,427 | Richards | Mar. 1, 1949 |
| 2,642,468 | Dodson | June 16, 1953 |
| 2,699,534 | Klostermann | Jan. 11, 1955 |
| 2,963,532 | Bell | Dec. 6, 1960 |